US 9,505,413 B2

(12) United States Patent
Laine

(10) Patent No.: US 9,505,413 B2
(45) Date of Patent: Nov. 29, 2016

(54) SYSTEMS AND METHODS FOR PRIORITIZED DRIVER ALERTS

(71) Applicant: Harman International Industries, Incorporated, Stamford, CT (US)

(72) Inventor: Heikki Laine, Pittstown, NJ (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/664,594

(22) Filed: Mar. 20, 2015

(65) Prior Publication Data
US 2016/0272215 A1    Sep. 22, 2016

(51) Int. Cl.
*B60W 40/09*    (2012.01)
*B60W 40/08*    (2012.01)

(52) U.S. Cl.
CPC ...... *B60W 40/09* (2013.01); *B60W 2040/0818* (2013.01); *B60W 2520/10* (2013.01); *B60W 2540/18* (2013.01); *B60W 2540/20* (2013.01); *B60W 2540/30* (2013.01); *B60W 2550/10* (2013.01); *B60W 2710/30* (2013.01)

(58) Field of Classification Search
CPC .......... B60R 2021/01013; B60R 2021/01322; B60R 2021/01327; B60R 21/013; B60R 21/0132; B60R 21/0133; B60R 21/0134; B60R 2300/30; B60R 2300/301; B60R 2300/302; B60R 2300/303; B60R 2300/804; B60R 2300/8066; B60R 2300/8093
See application file for complete search history.

(56) References Cited

U.S. PATENT DOCUMENTS

| | | | | |
|---|---|---|---|---|
| 5,892,855 A * | 4/1999 | Kakinami | ............ | G06K 9/4633 348/119 |
| 6,717,518 B1 * | 4/2004 | Pirim | ........................ | B60R 1/04 340/576 |
| 6,859,144 B2 * | 2/2005 | Newman | ................ | B60Q 9/008 340/436 |
| 7,400,968 B2 * | 7/2008 | Sakano | .............. | G01C 21/3641 340/995.1 |
| 7,924,146 B2 | 4/2011 | Seder et al. | | |
| 8,988,524 B2 * | 3/2015 | Smyth | ........................ | G01P 3/38 348/121 |
| 2002/0022927 A1 * | 2/2002 | Lemelson | ................ | G01S 19/11 701/301 |
| 2002/0140562 A1 | 10/2002 | Gutta et al. | | |

(Continued)

FOREIGN PATENT DOCUMENTS

JP    2007072629 A    3/2007
WO    2007029089 A1    3/2007

OTHER PUBLICATIONS

European Patent Office, Extended European Search Report Issued in Application No. 16159502.0, Jul. 21, 2016, Germany, 5 pages.

*Primary Examiner* — Calvin Cheung
(74) *Attorney, Agent, or Firm* — Alleman Hall McCoy Russell & Tuttle LLP

(57) ABSTRACT

Various methods and systems are provided for generating prioritized alerts for a driver based on a fusion of data from a plurality of sensors. In one example, a method comprises calculating a first route of a vehicle, calculating a second route of an obstacle, calculating a gaze of a driver of the vehicle, generating an alert responsive to the gaze not including the obstacle and the first route intersecting the second route within a threshold duration, and suppressing a generation of the alert otherwise.

20 Claims, 7 Drawing Sheets

(56) References Cited

U.S. PATENT DOCUMENTS

| | | | |
|---|---|---|---|
| 2003/0154017 A1* | 8/2003 | Ellis | A61H 3/061 701/117 |
| 2004/0215393 A1* | 10/2004 | Matsumoto | B60T 8/17557 701/300 |
| 2004/0239509 A1* | 12/2004 | Kisacanin | A61B 5/18 340/575 |
| 2004/0246114 A1 | 12/2004 | Hahn | |
| 2005/0004762 A1* | 1/2005 | Takahama | G01S 17/936 701/301 |
| 2005/0073136 A1* | 4/2005 | Larsson | A61B 3/113 280/735 |
| 2008/0060497 A1* | 3/2008 | Lambert | B60K 28/02 84/307 |
| 2008/0084283 A1* | 4/2008 | Kalik | B60Q 9/00 340/435 |
| 2008/0106462 A1* | 5/2008 | Shiraishi | G01S 11/12 342/146 |
| 2008/0169914 A1* | 7/2008 | Albertson | B60W 40/09 340/438 |
| 2009/0022368 A1* | 1/2009 | Matsuoka | B60K 35/00 382/103 |
| 2009/0118900 A1* | 5/2009 | Adachi | B62D 15/027 701/33.4 |
| 2009/0128311 A1* | 5/2009 | Nishimura | G08G 1/166 340/435 |
| 2010/0198513 A1* | 8/2010 | Zeng | B60W 40/02 701/300 |
| 2011/0169625 A1* | 7/2011 | James | B60Q 9/008 340/439 |
| 2012/0019655 A1* | 1/2012 | Fukamachi | G06T 7/2006 348/142 |
| 2012/0032817 A1* | 2/2012 | Cleveland | G06F 3/013 340/971 |
| 2012/0081236 A1* | 4/2012 | Best | G02B 27/0093 340/945 |
| 2012/0215403 A1* | 8/2012 | Tengler | B60W 50/12 701/36 |
| 2012/0271484 A1* | 10/2012 | Feit | B60W 50/14 701/1 |
| 2012/0300061 A1* | 11/2012 | Osman | G06F 1/3231 348/135 |
| 2013/0058529 A1* | 3/2013 | Levin | A61B 3/113 382/103 |
| 2013/0162632 A1* | 6/2013 | Varga | G06T 19/006 345/419 |
| 2013/0278442 A1* | 10/2013 | Rubin | G08G 9/02 340/905 |
| 2013/0282268 A1 | 10/2013 | Goerick et al. | |
| 2013/0335301 A1* | 12/2013 | Wong | G02B 27/0093 345/8 |
| 2014/0085282 A1* | 3/2014 | Luebke | G06F 3/147 345/207 |
| 2014/0249717 A1* | 9/2014 | Takahashi | B60R 21/00 701/36 |
| 2015/0009010 A1* | 1/2015 | Biemer | G01G 19/44 340/5.83 |
| 2015/0120138 A1* | 4/2015 | Zeng | B62D 15/0265 701/41 |
| 2015/0339589 A1* | 11/2015 | Fisher | G06N 99/005 706/12 |
| 2016/0001781 A1* | 1/2016 | Fung | B60W 40/08 701/36 |
| 2016/0031321 A1* | 2/2016 | Ono | B60K 35/00 701/41 |

* cited by examiner

SYSTEMS AND METHODS FOR PRIORITIZED DRIVER ALERTS

FIELD

The disclosure relates to prioritizing driver alerts based on outputs of various sensors.

BACKGROUND

Safe operation of a vehicle requires constant attention to the road and the environment surrounding the vehicle. A driver may encounter many obstacles while driving, not only at busy urban intersections, but virtually anywhere. Even the most attentive driver may not see someone coming at the last moment. Some driver assistance systems help drivers by detecting pedestrians in proximity to a vehicle and alerting drivers of the pedestrians' presence. However, such systems typically alert drivers of all pedestrians within the field of view of the system. The feedback provided is rarely more useful, or less overwhelming, than the actual situation as the driver sees it through the windshield.

SUMMARY

Embodiments are disclosed for generating prioritized driver alerts based on a fusion of data from a plurality of sensors. An example method includes calculating a first route of a vehicle, calculating a second route of an obstacle; calculating a gaze of a driver of the vehicle, generating an alert responsive to the gaze not including the obstacle and the first route intersecting the second route within a threshold duration, and suppressing an alert otherwise.

An example in-vehicle computing system of a vehicle includes an inter-vehicle system communication module communicatively connecting the in-vehicle computing system to one or more vehicle systems of the vehicle, a processor, and a storage device storing instructions executable by the processor to calculate a first route of the vehicle, calculate a second route of an obstacle, calculate a gaze of a driver of the vehicle, generate an alert responsive to the gaze not including the obstacle and the first route intersecting the second route within a threshold duration, and suppress the alert otherwise.

An example system for a vehicle includes a sensor subsystem including at least an obstacle sensor and a gaze sensor, the obstacle sensor configured to detect a moving obstacle and a velocity of the moving obstacle, the gaze sensor configured to detect a gaze of a driver of the vehicle. The system further includes a user interface configured to provide alerts to the driver, a navigation subsystem configured to evaluate a route of the vehicle, a non-transitory memory, and a processor configured with executable instructions stored in the non-transitory memory that when executed cause the processor to generate an alert responsive to the gaze of the driver not including the moving obstacle and the moving obstacle within the route of the vehicle, and suppress generation of an alert otherwise.

BRIEF DESCRIPTION OF THE DRAWINGS

The disclosure may be better understood from reading the following description of non-limiting embodiments, with reference to the attached drawings, wherein below.

DETAILED DESCRIPTION

The disclosure provides various methods and systems for providing prioritized driver alerts. As described further herein, an in-vehicle computing system may generate alerts based on a fusion of sensor data regarding the intended path of a vehicle, the intended path of an obstacle, and the attention of the driver of the vehicle. Obstacles may be understood to comprise any object which may potentially collide with the vehicle. The in-vehicle computing system may track the path of the vehicle as well as the path of obstacles in the proximity of the vehicle, and may determine whether or not the paths will intersect. Furthermore, the in-vehicle computing system may track the gaze of the driver in order to determine if the driver sees the obstacle. Since typical drivers continuously evaluate the potential for collision with obstacles within their field of view while driving, alerting the driver of every such obstacle may be redundant, and furthermore may distract or aggravate the driver. The in-vehicle computing system therefore generates alerts to the driver for obstacles which the driver may not see. Such a prioritization of alerts reduces overall distraction compared to other systems that do not selectively generate alerts based on such data fusion. In this way, the in-vehicle computing system of the present disclosure further highlights the urgency of the alerts that are generated.

Figure 1:
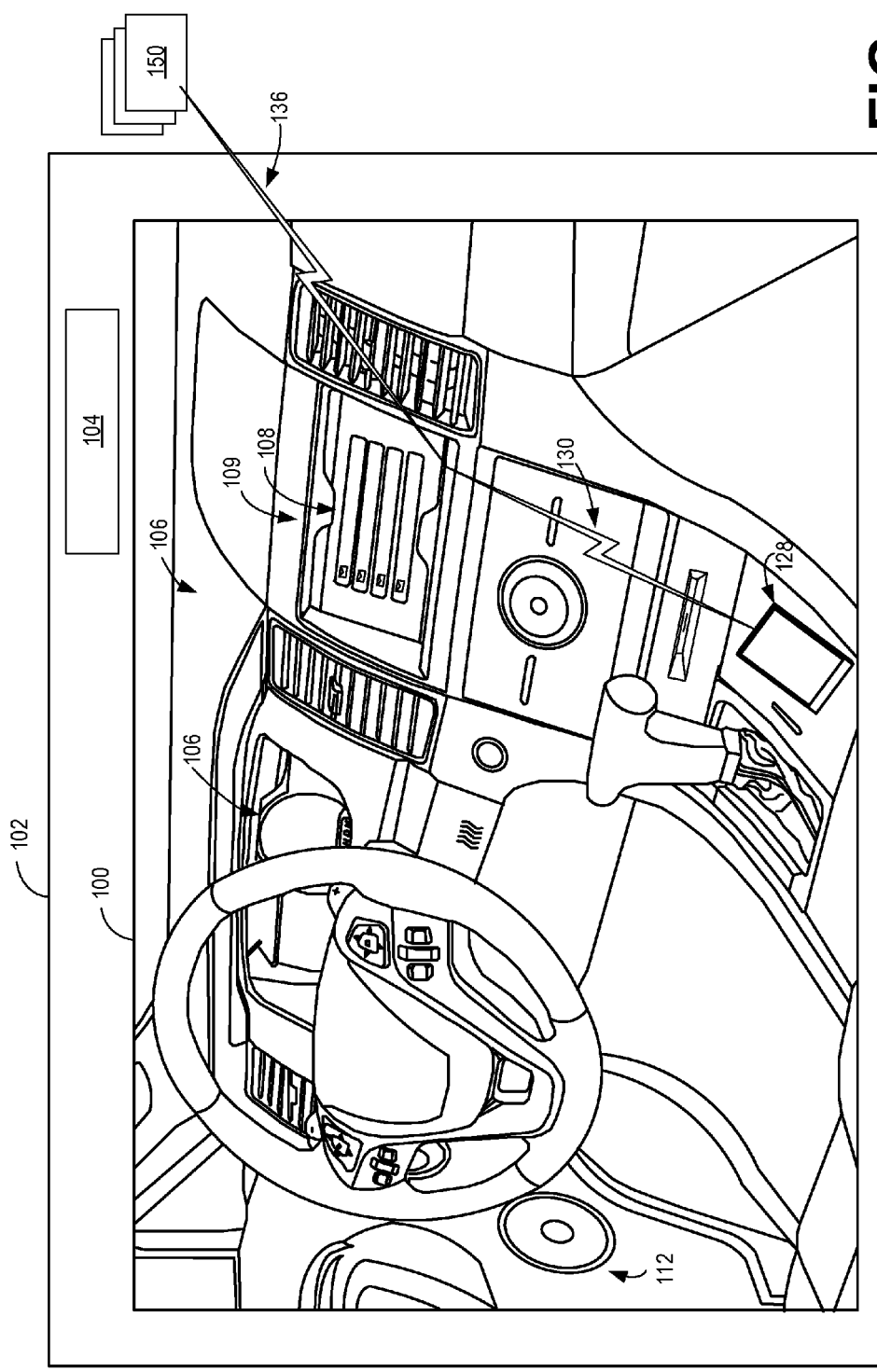
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
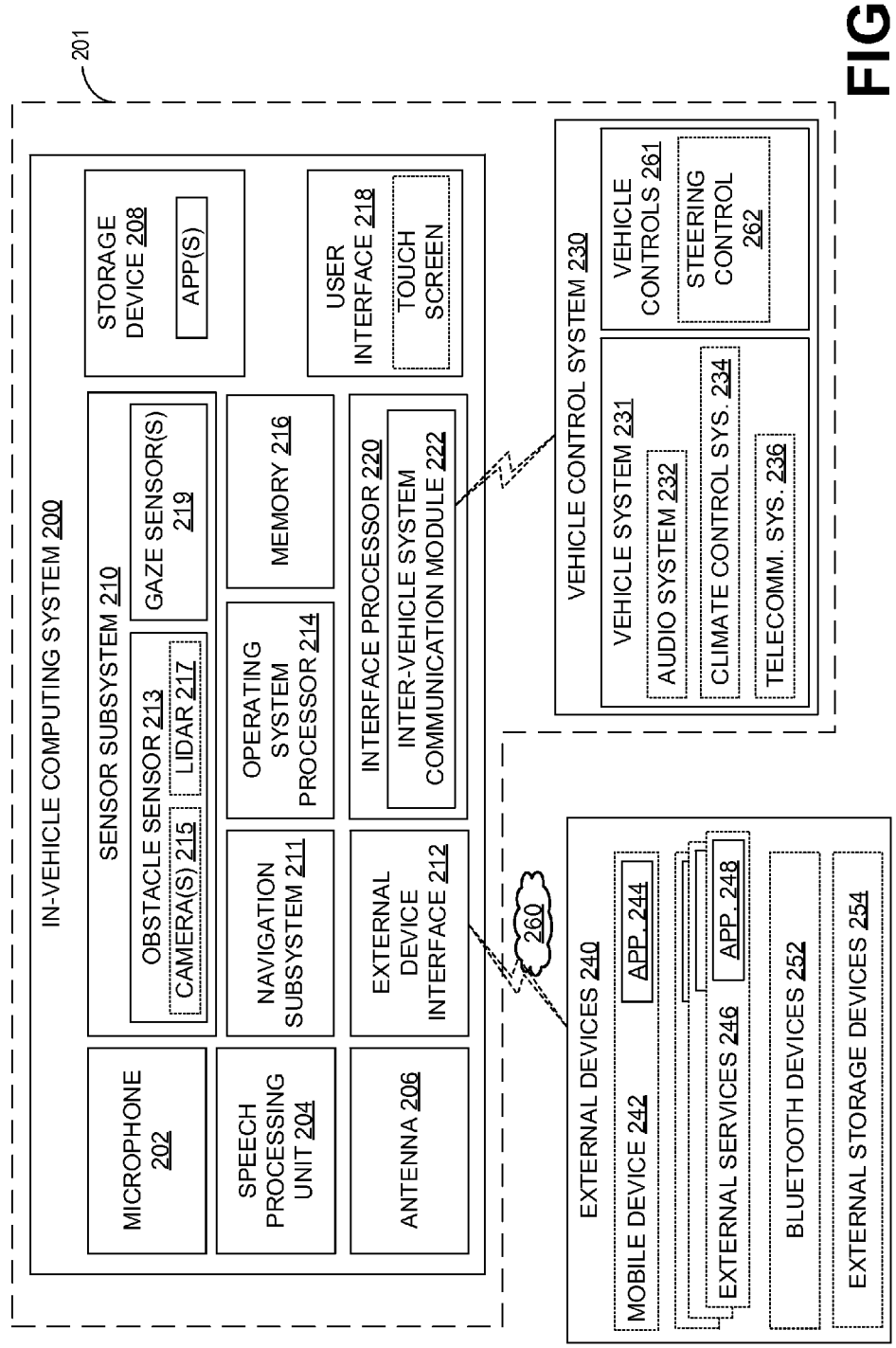
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be an advanced driver assistance system configured to provide alerts regarding obstacles (e.g., pedestrians, vehicles, etc.) to a user (e.g., a driver) based on a combination of sensor data. The driver assistance system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as engine controller area network [CAN] bus through which engine-related information may be communicated, a climate control CAN bus through which climate control-related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a BLUETOOTH link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include an obstacle sensor 213. Obstacle sensor 213 may comprise, as a non-limiting example, one or more cameras 215 to detect obstacles. In one example, the one or more cameras 215 may comprise a front view camera for detecting and monitoring obstacles, including but not limited to pedestrians, vehicles, bicyclists, strollers, animals, and so on. As another example, camera 215 may additionally or alternatively comprise a rear view camera for assisting a user in parking the vehicle. In another example, camera 215 may additionally or alternatively comprise a cabin camera for identifying a user (e.g., using facial recognition and/or user gestures). As another example, the one or more cameras 215 may include a front view camera, a rear view camera, and/or a cabin camera.

In an additional or alternative example, the obstacle sensor 213 may comprise a light radar (lidar) system 217 configured to illuminate an obstacle with a laser and analyze reflected light. For example, lidar 217 may comprise a time-of-flight range imaging camera system that measures the time of flight of a light signal between the camera and the obstacle in order to determine depth data corresponding to imaged objects/obstacles.

In some examples, obstacle sensor 213 may include dedicated hardware and/or software (not shown), including but not limited to a graphical processing unit (GPU) configured to process images obtained by the cameras 215 and/or the lidar 217. In this way, the output of the obstacle sensor 213 may comprise obstacle data calculated from raw images and/or data obtained via the cameras 215 and/or the lidar 217, such as the location (e.g., an absolute location, a relative location, a location in two-dimensional space, a location in three-dimensional space, etc.) of one or more obstacles, the velocity of the one or more obstacles, a category for each of the one or more obstacles (e.g., pedestrian, vehicle, etc.), and so on. In other examples, raw data and/or images generated by the obstacle sensor 213 may be processed by hardware and/or software implemented in the sensor subsystem 210 and/or the in-vehicle computing system 200.

Sensor subsystem 210 may further include a gaze sensor 219 configured to detect a gaze of a user of the vehicle 201, such as a driver. Gaze sensor 219 may comprise one or more cameras implemented within the cabin of the vehicle 201 and configured to detect and track the gaze of the driver. To that end, gaze sensor 219 may be configured to measure one or more quantities, including but not limited to head tilt angle, head turn angle, eye position, and so on, in order to calculate the direction of the driver's gaze in three dimensions. Such angles and positions may be measured with respect to a reference position, for example the reference position may comprise the head of the driver as the driver is sitting and facing forward in the vehicle wherein the head is vertically and horizontally aligned, and the pupils of the driver's eyes positioned at the center of the eyes. In this way, the head tilt angle may comprise an angular deviation of a fixed point of the head (e.g., a chin, nose, etc.) from a horizontal plane, while the head turn angle may comprise an angular deviation of the same fixed point from a vertical plane, wherein the horizontal and vertical planes are orthogonal.

Sensor subsystem 210 of in-vehicle computing system 200 may communicate with and receive inputs from various vehicle sensors and may receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupled to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a BLUETOOTH connection) or an alternate BLUETOOTH-enabled device 252. Mobile device 242 may be a mobile phone, smart phone, wearable devices/sensors that may communicate with the in-vehicle computing system via wired and/or wireless communication, and/or other portable electronic device(s). Other external devices include external services 246 (e.g., remote server systems). For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, image data captured by a camera integrated into the mobile device, etc. Mobile application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from the mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
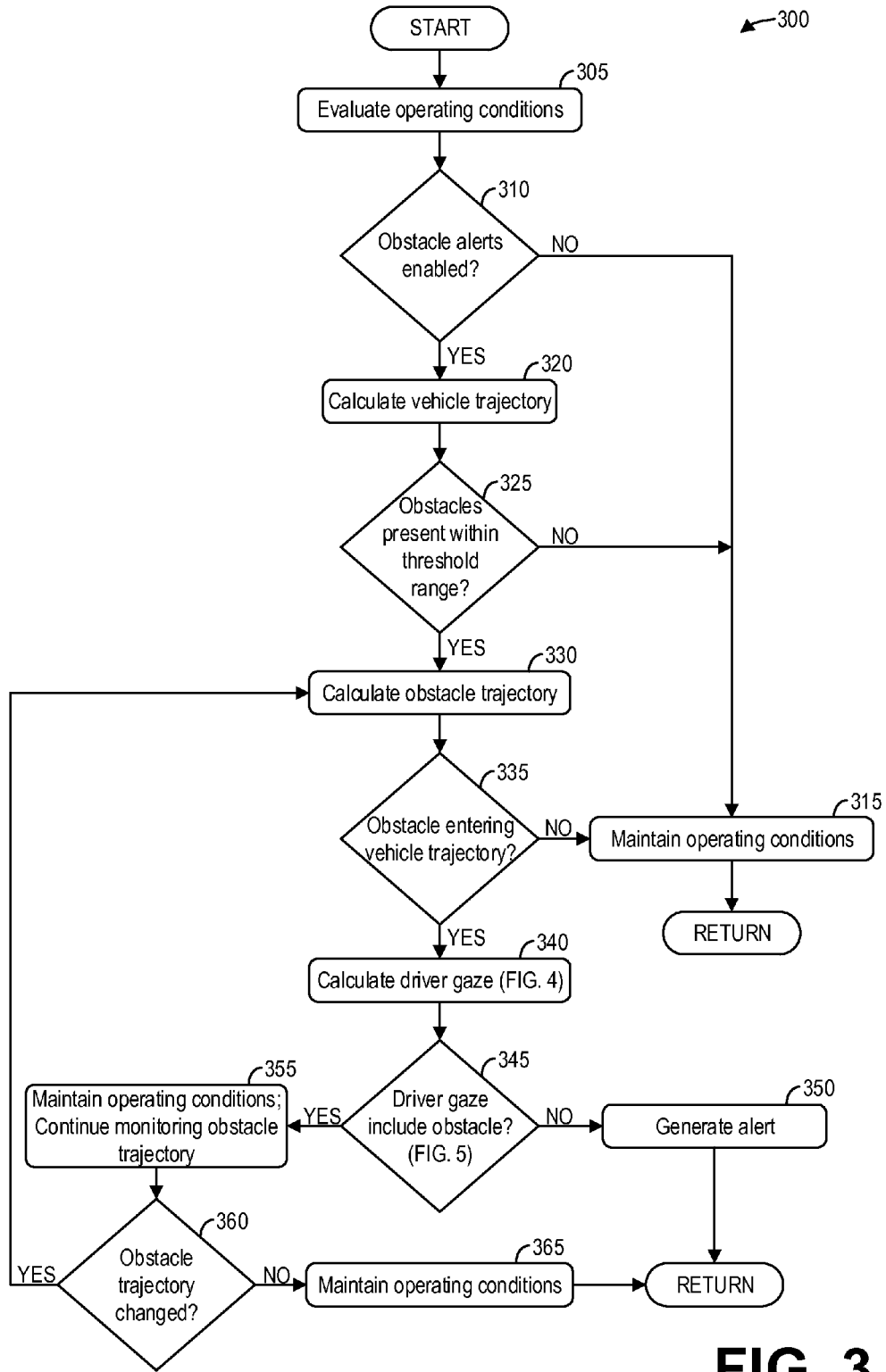
FIG. 3 shows a high-level flow chart illustrating an example method for generating prioritized driver alerts in accordance with one or more embodiments of the present disclosure.

FIG. 3 shows a high-level flow chart illustrating an example method 300 for prioritizing alerts generated for a driver of a vehicle. In particular, method 300 relates to alerting a driver of a potential obstacle, such as a pedestrian or another vehicle, which the driver has not seen and with which the driver is in danger of colliding. The method compares the route of the vehicle to the route of a potential obstacle to determine if the routes will intersect, and further determines if the driver has noticed the potential obstacle. If the driver has noticed the potential obstacle, an alert may be generated; otherwise, an alert may not be generated. In this way, a driver may be alerted to the presence of a potential obstacle only if the driver has not noticed the potential obstacle and/or only if the potential obstacle is on a possible collision course with the driver/vehicle. Method 300 may be carried out using the systems and components depicted in FIGS. 1 and 2. For example, method 300 may be implemented as executable instructions in non-transitory memory 216 and executed by the processor 214 of the in-vehicle communication system 200 (e.g., in combination with one or more additional hardware elements of the system). However, it should be appreciated that the method may be carried out using other systems and components without departing from the scope of the disclosure.

Method 300 begins at 305. At 305, method 300 may include evaluating operating conditions. Evaluating operating conditions may comprise measuring and/or estimating operating conditions. As a non-limiting example, operating conditions may include vehicle operating conditions such as vehicle speed, steering wheel angle, turn signal status, vehicle acceleration, vehicle location, and so on. Such operating conditions may be received from a vehicle control system, such as vehicle control system 230. Operating conditions may further include operating conditions of the in-vehicle communication system 230 of FIG. 2. For example, operating conditions may include navigational data (e.g., GPS coordinates, pre-determined and/or predicted vehicle route, etc.), driver gaze, and raw and/or processed data regarding obstacles in the vicinity of the vehicle. In some examples, evaluating operating conditions may further comprise retrieving and evaluating one or more conditions from a remote source, for example over a network 260 or via antenna 206. For example, operating conditions may further include weather conditions, traffic conditions, and so on, which comprise operating conditions external to the vehicle and as such may be obtained from a remote source.

At 310, method 300 may include determining if obstacle alerts are enabled. As described further herein, obstacle alerts may comprise alerts generated responsive to the driver not noticing a potential obstacle. The driver may choose to enable or disable obstacle alerts. For example, the driver may enable or disable obstacle alerts via the user interface 218 and/or via voice commands input to a microphone 202 and processed by the speech processing unit 204 of FIG. 2. In some examples, obstacle alerts may be enabled and/or disabled at will (e.g., dynamically) while the vehicle is operating.

If obstacle alerts are not enabled, method 300 may continue to 315. At 315, method 300 includes maintaining operating conditions, such as those evaluated at 305. Method 300 may then return. In this way, the method does not generate any alerts while obstacle alerts are disabled. Furthermore, the method continuously monitors the obstacle alerts status such that the method may continue (e.g., proceed from 310) once obstacle alerts are enabled.

Returning to 310, if obstacle alerts are enabled, method 300 may continue to 320. At 320, method 300 includes calculating the vehicle path/trajectory. The vehicle path comprises a projection of the vehicle position over time. The vehicle path may be obtained from the navigation subsystem. For example, the vehicle path may be calculated based at least in part on navigational route guidance data. In such an example, the driver may utilize the navigation subsystem for guidance towards a particular destination input to the navigation subsystem, and may be reasonably expected to adhere to a route to the particular destination provided by the navigation subsystem. However, since a driver may deviate from the provided route at any moment, the projected vehicle path may not be entirely based on the provided route. As an illustrative example, a driver may decide to turn from a first road onto a second road rather than continue driving along the first road, despite the navigation subsystem indicating that the driver should proceed along the first road to reach the destination. As a result, the vehicle path may be additionally or alternatively calculated based on vehicle control data, such as vehicle speed, steering wheel angle, turn signal status, vehicle location, and so on. For example, in the illustrative example given above where the driver deviates from the provided navigational route by turning onto the second road, the vehicle path may be calculated based on a turn signal indicating that the driver is making a turn (in addition to the selected direction of the turn, i.e., left or right), as well as the steering wheel angle (e.g., indicating that the driver is turning), and vehicle speed/acceleration (e.g., the driver is decelerating the vehicle in preparation for the turn).

Furthermore, the vehicle path may be calculated based on the vehicle speed and acceleration. For example, the position of the vehicle over time may be calculated using basic kinematic equations along with the vehicle speed, acceleration, and current position as inputs.

At 325, method 300 includes determining if there are obstacles present within a threshold range of the vehicle. Determining the presence of obstacles may comprise processing images and/or data obtained by obstacle sensor 213 to detect an obstacle signature. For example, image data may be obtained by one or more cameras 215 and/or lidar 217 of FIG. 2. Obstacles within the image data may be detected via processing of the image data. As a non-limiting example, obstacles may be detected by applying computer vision techniques to acquired image data. Computer vision techniques may include, as non-limiting examples, image processing techniques, statistical analysis techniques (e.g., pattern/object/feature/edge recognition algorithms), combinations thereof, and so on. Such techniques enable real-time detection of objects, including obstacles, within images, and may extract additional information from the images. For example, feature detection algorithms may process the image data to detect features associated with typical obstacles, such as pedestrians, vehicles, and so on. In this way, the type of obstacle may be detected in addition to the presence of an obstacle.

Upon detecting an obstacle, any calculated information regarding the obstacle may be at least temporarily saved in memory (e.g., memory 216 of FIG. 2) along with a time stamp associated with the calculated information. For example, as the obstacle moves in real-time, and thus as the position of the obstacle within the image data retrieved and processed in real-time changes, the position of the obstacle may be recorded in memory along with a time stamp associated with the position.

If no obstacles are present, method 300 may proceed to 315 and maintain operating conditions, such as those evaluated at 305. Method 300 may then end and return. In this way, the method continuously evaluates whether or not an obstacle is within the vicinity of the vehicle.

However, if obstacles are present within the threshold range, method 300 continues to 330. At 330, method 300 includes calculating the obstacle path/trajectory. The obstacle path may be calculated based on a velocity, acceleration, and position of the obstacle, for example, and kinematic equations. In one example, the velocity, acceleration, and position of the obstacle may be obtained as described above by processing image data from the obstacle sensor 213. For example, the position at a given time may be determined from a single image, while the velocity (i.e., the speed and direction of the obstacle) may be calculated from the position of the obstacle over time, for example based on the calculated position data and the associated time stamps (e.g., based on a changing position of the obstacle in a series of images, each of which may be time stamped). Similarly, the acceleration of the obstacle may be calculated based on the calculated velocity as a function of time. In this way, the intended path of the obstacle may be extrapolated over time based on quantities calculated from the image data acquired by one or more sensors, such as obstacle sensor 213 of FIG. 2.

In another example, the velocity, acceleration, and position of the obstacle may be calculated based on GPS data received from a computing device carried by the obstacle. For example, a pedestrian and/or a second vehicle may carry a mobile device (e.g., mobile device 242 of FIG. 2) configured with an application, and the application may be configured to interface with an external device interface (e.g., interface 212 of FIG. 2) of the in-vehicle computing system via a wireless network. In particular, the external device interface may retrieve GPS coordinates of the pedestrian and/or the second vehicle from the application of the mobile device. The method may then include correlating the position of the mobile device (and thus the pedestrian, second vehicle, and/or other obstacle) with the position of the obstacle (e.g., as detected via an obstacle sensor, such as sensor 213 of FIG. 2). In this way, the process of tracking the obstacle (e.g., the pedestrian, second vehicle, and/or other obstacle carrying the mobile device) and calculating the exact position, velocity, and acceleration of the obstacle may be carried out based on GPS data continuously received from the mobile device. The obstacle path may then be calculated based on the position, velocity, and acceleration calculated from the GPS data. As a result, the in-vehicle computing system 200 may more efficiently allocate its computational resources to tasks other than continuously processing the image data to track the obstacle.

At 335, method 300 includes determining if the obstacle is entering the vehicle path. Determining if the obstacle is entering the vehicle path may comprise comparing the vehicle path to the obstacle path. In one example, determining if the obstacle is entering the vehicle path may include determining if the obstacle path intersects or is expected/predicted to intersect the vehicle path within a threshold time duration T (e.g., based on a calculation of the obstacle/vehicle path and the speed of the obstacle/vehicle). The threshold duration T may be selected such that the obstacle path intersecting the vehicle path within the threshold duration T indicates that the obstacle may cross in front of the vehicle while the vehicle is traveling. For example, a fast-moving obstacle may cross the vehicle path within the threshold duration T such that the obstacle crosses in front of the vehicle while the vehicle is traveling, while a slow-moving obstacle may cross a point in the vehicle path outside of the threshold duration T such that the obstacle crosses after the vehicle has traveled past the point in the vehicle path (e.g., the obstacle path and the vehicle path intersect, but not until the vehicle has traveled past the point of intersection).

As an illustrative and non-limiting example, if the vehicle is traveling in a straight path (e.g., in one dimension) at a constant speed v, the threshold duration T may be determined based on a distance d ahead of the vehicle and the vehicle speed v, or T=d/v. In one example, the distance d may be selected based on the speed of the vehicle. For example, the distance d may increase with vehicle speed v, since the vehicle travels further in a given time interval at larger speeds compared to lower speeds. As an example, a vehicle traveling at 60 kilometers per hour travels 10 meters in 0.6 seconds while a vehicle traveling at 10 kilometers per hour travels 10 meters in 3.6 seconds. Similarly, the threshold duration T may be preset such that the driver of the vehicle is given enough time to respond to an obstacle. As described further herein, if the obstacle is entering the path (and thus a collision between the vehicle and the obstacle may occur) and the driver does not see the obstacle, an alert may be generated in order to draw the driver's attention to the obstacle. The driver may then react to the obstacle, for example, by slowing down the vehicle, rerouting the vehicle, or stopping the vehicle altogether. Thus, the threshold duration T may be determined such that the driver is given sufficient time to react to the obstacle.

If the obstacle is not entering the vehicle path, method 300 may continue to 315. At 315, method 300 may include maintaining operating conditions, such as those evaluated at 305. Method 300 may then end and return.

However, if the obstacle is entering the vehicle path, method 300 may proceed to 340. At 340, method 300 includes calculating the driver gaze, or the line of sight from the eyes of the driver. The driver gaze may be calculated based on data acquired by a sensor (e.g., gaze sensor 219 of FIG. 2), such as head turn angle, head tilt angle, eye position, and so on. Furthermore, since the driver gaze may constantly change, the driver gaze may be continuously monitored and/or monitored at regular intervals. The duration of each line of sight in addition to the line of sight itself may be recorded at least temporarily in memory (e.g., memory 216 of FIG. 2) along with a timestamp to indicate when and for how long the driver gaze is focused in a particular direction. A method for calculating the driver gaze is described further herein and with regard to FIG. 4.

At 345, method 300 may include determining if the driver gaze includes the obstacle. Determining if the driver gaze includes the obstacle may comprise calculating if the position of an obstacle at a given time coincides with the driver gaze or line of sight of the driver at the same given time. The coincidence of the driver gaze with the position of the obstacle at a given time may be referred to hereinafter as an obstacle-gaze coincidence. A method for determining if the driver gaze includes the obstacle is described further herein with regard to FIG. 5.

In some examples, determining if the driver gaze includes the obstacle may further comprise determining a temporal duration of the obstacle-gaze coincidence and comparing this duration to a first threshold duration T1. For example, the first threshold duration T1 may comprise a minimum amount of time that an obstacle-gaze coincidence may occur before the system assumes that the driver has recognized and/or identified the obstacle. In such an example, the driver gaze may be considered to include the obstacle if the duration of the obstacle-gaze coincidence is greater than the threshold duration T1, and the driver gaze may not include the obstacle if the duration of the obstacle-gaze coincidence is less than the threshold duration T1. In this way, a momentary glance, for example, in a certain direction, may not establish that the driver gaze includes an obstacle, even if the driver gaze and the obstacle position coincide. In one example, the threshold duration T1 may be predetermined based on an average time estimated (e.g., based on calibration/observation of responses by a particular user and/or a group of users) for a person to recognize the presence of an object.

Similarly, determining if the driver gaze includes the obstacle may further comprise determining if the obstacle-gaze coincidence occurs within a second threshold duration T2. The driver gaze may be considered to include the obstacle if the obstacle-gaze coincidence occurs within the second threshold duration T2, and the driver gaze may not be considered to include the obstacle if the obstacle-gaze coincidence occurs outside the second threshold duration T2. The second threshold duration T2 may comprise a dynamic quantity which indicates that the obstacle-gaze coincidence occurred recently enough that the obstacle-gaze coincidence is valid. As an illustrative and non-limiting example, suppose that a vehicle arrives at a stop sign, and meanwhile that the driver gaze coincides with a first pedestrian walking down the sidewalk to the right of the vehicle, hereinafter referred to as the first obstacle-gaze coincidence. Suppose then that a second pedestrian is crossing the street in front of the vehicle from the right of the vehicle to the left of the vehicle while the vehicle is stopped at the stop sign, and that the driver gaze now coincides with the second pedestrian. If the driver gaze continues to include the second pedestrian (such that the driver is looking to the left) while waiting for the second pedestrian to finish crossing the street, and the first pedestrian continues walking on the right and begins crossing the street, enough time may have passed that the duration since the first obstacle-gaze coincidence is outdated. In other words, even though the driver initially noticed the first pedestrian, the driver may not realize that the first pedestrian is now crossing the street because enough time has passed that the driver may not know the current position of the first pedestrian.

If the driver gaze does not include the obstacle, method 300 may continue to 350. At 350, method 300 includes generating an alert. The alert may be visual, auditory, combinations thereof, etc. such that the alert is perceivable by the driver. In one example, the alert may include indicia regarding the position of the obstacle. For example, such indicia may include explicit markings for visual alerts (e.g., arrows indicating the location of the obstacle) and similarly for audible alerts (e.g., a recording of a voice saying "obstacle on the left" may be played over the audio system). In other examples, such indicia may be more subtle. For example, for audible alerts a tone or other recording may be emitted from a particular speaker in the vehicle to indicate the direction of the obstacle (e.g., a tone emitted from a front left speaker may indicate an obstacle to the front left of the vehicle, a tone emitted from a rear right speaker may indicate an obstacle to the rear right of the vehicle, and so on). In another example, audible or visual alerts may have other selectable features based on the position or other aspect of the obstacle. For example, a frequency of an audible alert may increase as an obstacle nears the vehicle, as a speed of the obstacle increases, etc. Similarly, a color, size, or other visible feature may change responsive to a location or other aspect of the obstacle (e.g., a size of the alert may increase as the obstacle nears the vehicle, increases speed, etc. and decrease as the obstacle gets farther away from the vehicle, decreases speed, etc.). Method 300 may then end and return.

If the driver gaze includes the obstacle, method 300 may continue to 355. At 355, method 300 includes maintaining operating conditions, such as those evaluated at 305. Furthermore, at 355 method 300 includes monitoring the obstacle path (e.g., to detect changes in the obstacle path, obstacle speed, etc.). Method 300 may then proceed to 360. At 360, method 300 may include determining if the obstacle path has changed. For example, the trajectory of the obstacle observed at 355 may be compared to the obstacle path calculated at 330, which may be stored at least temporarily in non-transitory memory, to determine deviations of the trajectory from the calculated path. Such deviations increasing above a threshold may indicate that the obstacle path has changed, while deviations remaining below the threshold may indicate that the obstacle path has not changed. A threshold designed in this way may allow for slight and unsubstantial changes in the obstacle trajectory. If the obstacle path has not changed, method 300 may continue to 365 and maintain operating conditions. Method 300 may then end and return.

However, if the obstacle path has changed, method 300 may return to 330 and recalculate the obstacle path. The method may then continue as described above. In this way, the method may continuously monitor the path of an obstacle, even after the establishment of a valid obstacle-gaze coincidence, and determine whether or not to generate an alert. An alert may be generated responsive to a change in the route of the obstacle if the gaze does not include the obstacle after the change in the obstacle route.

Figure 4:
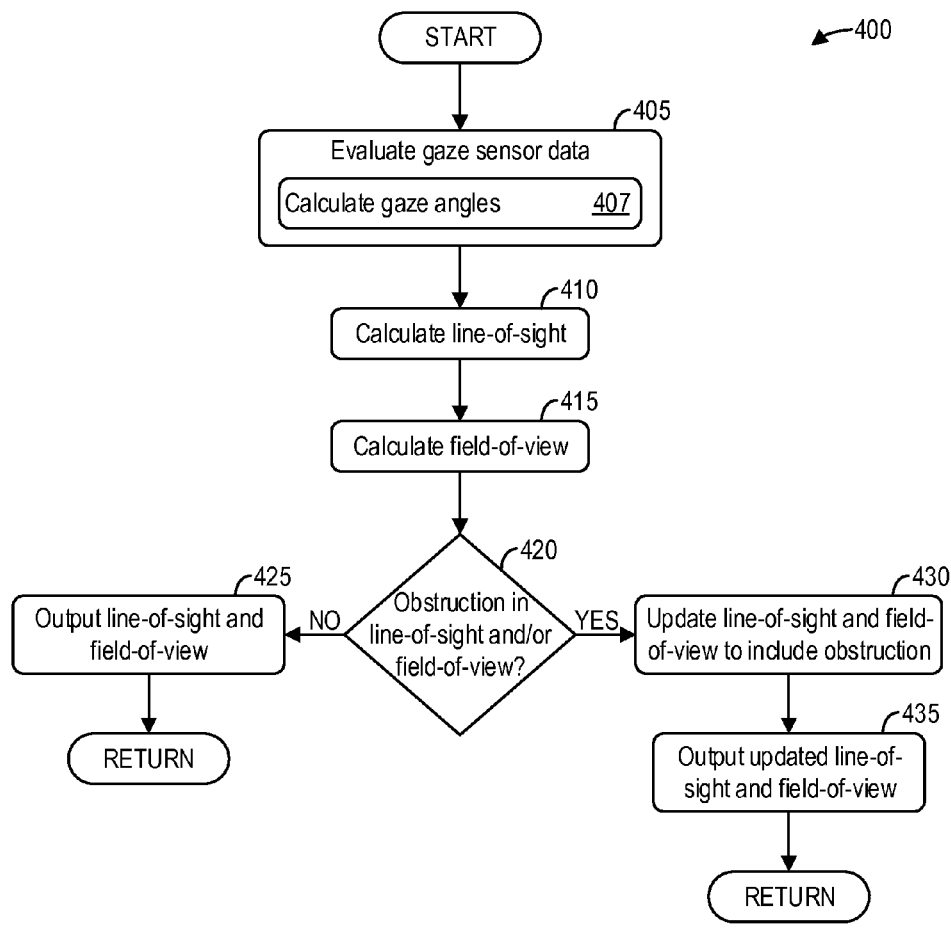
FIG. 4 is a flow chart of an example method for determining a line of sight and field of view of a driver in accordance with one or more embodiments of the present disclosure.

FIG. 4 shows a high-level flow chart illustrating an example method 400 for calculating a driver gaze. The driver gaze may be calculated based on image data acquired by gaze sensor 219 of FIG. 2, for example, and may comprise a line-of-sight and a field-of-view. Method 400 may comprise a subroutine of method 300 of FIG. 3. In particular, method 400 may comprise the step 340 of method 300. Method 400 may be carried out using the systems and components described herein with regard to FIGS. 1 and 2, for example the method may be stored as executable instructions in non-transitory memory 216 and executed by the processor 214 of FIG. 2. However, it should be understood that the method may be carried out using other systems and components without departing from the scope of the disclosure.

Method 400 may begin at 405. At 405, method 400 includes evaluating gaze sensor data. Evaluating gaze sensor data may comprise processing, using image processing techniques, data acquired by a gaze sensor, such as gaze sensor 219 of FIG. 2. Evaluating the gaze sensor data may further comprise, at 407, calculating gaze angles. The gaze angles may be calculated based on the processed gaze sensor data. Gaze angles may include, as non-limiting examples, a head turn angle, a head tilt angle, eye position, and so on.

At 410, method 400 may include calculating a line-of-sight. The line-of-sight may comprise a line extending, for example, from the bridge of the driver's nose to a threshold range, where the threshold range comprises a distance from the driver and/or the vehicle beyond which an obstacle sensor (e.g., obstacle sensor 213) may not detect and/or track potential obstacles. The direction of the line-of-sight may be calculated based on the gaze angles computed at 407.

At 415, method 400 includes calculating a field-of-view. A field-of-view comprises an extent of the observable world that may be seen by the driver. In one example, the field-of-view may comprise a volumetric range about the line-of-sight. Therefore, the field-of-view may be calculated based on the line-of-sight calculated at 410 and the gaze angles calculated at 407. In some examples, the calculated field-of-view may be smaller than the full field-of-view actually visible to the driver. For example, the horizontal field-of-view may be narrower than the full field-of-view in order to exclude obstacles which may be on the periphery of the full field-of-view, as the certainty of the driver seeing such obstacles is smaller than if the obstacle is located at the center of the field-of-view.

At 420, method 400 includes determining if one or more obstructions are located within the field-of-view. Obstructions may comprise structural elements of the vehicle which block the field-of-view. For example, obstructions may include pillars which comprise vertical or near-vertical supports of the roof of a vehicle. For example, two A-pillars are typically located at the front of the vehicle cabin, wherein one A-pillar is located to the left of the vehicle windshield and a second A-pillar is located to the right of the vehicle windshield. Additional pillars may be located between the driver and front passenger windows and a rear window (B-pillars), between the rear passenger windows and the rear windshield (C-pillars), and so on. Pillars are typically enclosed steel structures, and so may obstruct the field-of-view of a driver. Obstructions may further comprise rear view mirrors, the roof of the vehicle, and so on. Thus, determining if one or more obstructions are located within the field-of-view may include referencing a three-dimensional diagram of the vehicle structure and/or other image or representation of the vehicle and determining if at least an element of the vehicle structure is within the field-of-view.

If no obstructions are within the field-of-view, method 400 may continue to 425. At 425, method 400 includes outputting the driver gaze, the driver gaze comprising the line-of-sight and the field-of-view. Method 400 may then return.

However, if an obstruction is located within the field-of-view, method 400 may continue to 430. At 430, method 400 may include updating the line-of-sight and the field-of-view to include the obstruction. For example, if the line-of-sight is along the obstruction, the line-of-sight may be updated to terminate at the obstruction. As an illustrative and non-limiting example, if the driver is looking up at the roof of the vehicle, the driver may not see beyond the roof of the vehicle and so the line-of-sight (and subsequently, the field-of-view) may be limited to within the cabin of the vehicle. Similarly, if the driver is looking directly at an A-pillar, the line-of-sight may be updated to terminate at the A-pillar. However, the driver may still be able to see beyond the A-pillar despite looking directly at the A-pillar. To that end, the field-of-view may be updated to exclude at least a portion of the field-of-view extending from the updated line-of-sight to the original line-of-sight. That is, the volume of space located behind the A-pillar (from the perspective of the driver) may be removed from the field-of-view. Such a volume of space is typically referred to as a blind spot. In this way, a pedestrian within a blind spot may not be considered within the driver gaze.

After updating the driver gaze, method 400 may continue to 435. At 435, method 400 includes outputting the updated driver gaze comprising the updated line-of-sight and field-of-view. For example, the updated driver gaze may be output to a processor and/or storage device of an in-vehicle computing system for use in determining whether to generate an alert. Method 400 may then return.

Figure 5:
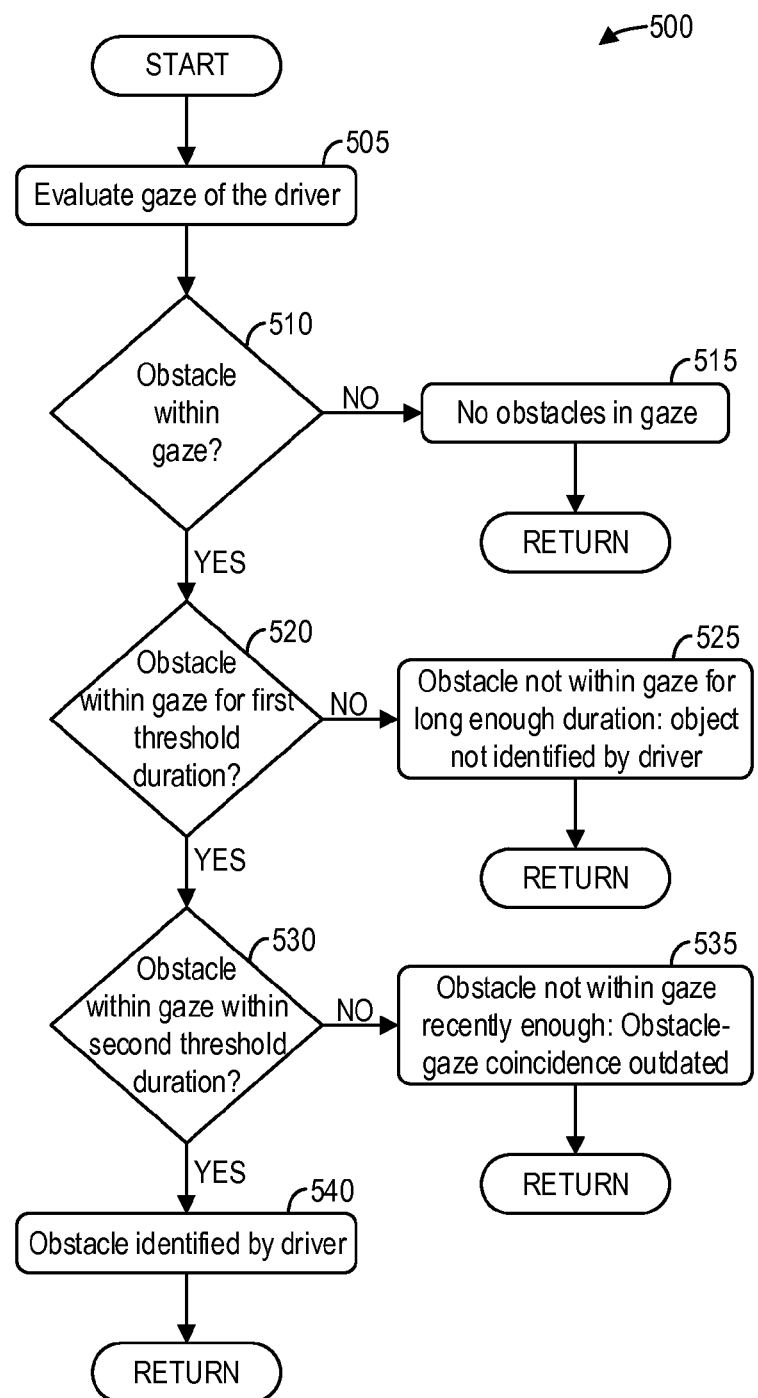
FIG. 5 shows a high-level flow chart illustrating an example method for determining if an obstacle is within a driver gaze in accordance with one or more embodiments of the present disclosure.

FIG. 5 shows a high-level flow chart illustrating an example method 500 for determining if a driver gaze includes an obstacle. Method 500 may comprise a subroutine of method 300 of FIG. 3. In particular, method 500 may comprise (e.g., may be executed when performing) the step 345 of method 300. Method 500 may be carried out using the systems and components described herein with regard to FIGS. 1 and 2, for example the method may be stored as executable instructions in non-transitory memory 216 and executed by the processor 214 of FIG. 2. However, it should be understood that the method may be carried out using other systems and components without departing from the scope of the disclosure.

Method 500 may begin at 505. At 505, method 500 includes evaluating the gaze of the driver. Evaluating the gaze of the driver may comprise calculating the driver gaze as described herein above with regard to FIG. 4, or retrieving the driver gaze calculation output at 425 or 435 from a storage device. The driver gaze may be calculated based on data acquired by a gaze sensor (e.g., gaze sensor 219 of FIG. 2), such as head turn angle, head tilt angle, eye position, and so on. Furthermore, since the driver gaze may constantly change, the driver gaze may be continuously monitored, and a current driver gaze, an average driver gaze over a duration, and/or a selection of previously-determined driver gaze measurements may be stored in a storage device for evaluation. The duration of each line of sight (e.g., the amount of time that a particular line of sight is maintained) in addition to the line of sight itself may be recorded at least temporarily in memory (e.g., memory 216 of FIG. 2) along with a timestamp to indicate when and for how long the driver gaze is focused in a particular direction.

At 510, method 500 may include determining if the obstacle is within the gaze. Determining if the driver gaze includes the obstacle may comprise calculating if the position of an obstacle at a given time coincides with the driver gaze of the driver at the same given time. In particular, the driver gaze includes the obstacle if the position of the obstacle is within the driver gaze (including the line-of-sight and the field-of-view). In some examples, the obstacle may not be considered within the driver gaze if the obstacle is at the periphery of the field-of-view. The coincidence of the driver gaze with the position of the obstacle at a given time may be referred to hereinafter as an obstacle-gaze coincidence.

If the obstacle is not within the gaze, method 500 may continue to 515. At 515, method 500 includes concluding that the obstacle is not in the gaze. Such a determination may be stored for use in determining whether or not an alert is to be generated (e.g., according to method 300 of FIG. 3). Method 500 may then return.

If an obstacle is within the gaze, method 500 may proceed to 520. At 520, method 500 may include determining if the obstacle is within the gaze for a first threshold duration. Determining if the obstacle is within the driver gaze for a first threshold duration may comprise determining a temporal duration of the obstacle-gaze coincidence and comparing this duration to a first threshold duration T1. For example, the first threshold duration T1 may comprise a minimum amount of time that an obstacle-gaze coincidence may occur before the system may assume that the driver has recognized and/or identified the obstacle. In such an example, the driver gaze may be considered to include the obstacle if the duration of the obstacle-gaze coincidence is greater than the threshold duration T1, and the driver gaze may not include the obstacle if the duration of the obstacle-gaze coincidence is less than the threshold duration T1. In this way, a momentary glance, for example, in a certain direction may not establish that the driver gaze includes an obstacle, even if the driver gaze and the obstacle position coincide. In one example, the threshold duration T1 may be predetermined based on an average time required for a person to recognize the presence of an object.

If the obstacle is not within the gaze for the first threshold duration, method 500 may continue to 525. At 525, method 500 includes concluding that the obstacle has not been within the gaze for a long enough duration, and determining that the obstacle is not identified by the driver. Such a determination may be stored for use in determining whether or not an alert is to be generated (e.g., according to method 300 of FIG. 3). Method 500 may then return.

If the obstacle is within the gaze for the first threshold duration, method 500 may continue to 530. At 530, method 500 may include determining if the obstacle is within the driver gaze within a second threshold duration T2. The driver gaze may be considered to include the obstacle if the obstacle-gaze coincidence occurs within the second threshold duration T2, and the driver gaze may not include the obstacle if the obstacle-gaze coincidence occurs outside the second threshold duration T2. The second threshold duration T2 may comprise a dynamic quantity which indicates that the obstacle-gaze coincidence occurred recently enough that the obstacle-gaze coincidence is valid. An example scenario involving an example threshold duration T2 is described above.

If the obstacle is not within the gaze for a second threshold duration, method 500 may continue to 535. At 535, method 500 includes concluding that the obstacle is not within the driver gaze recently enough, and determining that the obstacle-gaze coincidence is outdated. Such a determination may be stored for use in determining whether or not an alert is to be generated (e.g., according to method 300 of FIG. 3). Method 500 may then return.

However, if the obstacle is within the gaze within the second threshold duration, method 500 may continue to 540. At 540, method 500 includes concluding that the obstacle is identified by the driver. Such a determination may be stored for use in determining whether or not an alert is to be generated (e.g., according to method 300 of FIG. 3). For example, if the obstacle evaluated at 540 is the only obstacle identified by the system, an alert may not be generated (e.g., unless conditions, such as an obstacle or vehicle path, change) at that time, due to the determination that the driver has identified the obstacle. Method 500 may then return. It is to be understood that method 500 may be performed iteratively (or simultaneously) for each obstacle identified by the system in order to determine which obstacles have been identified by the driver.

Figure 6:
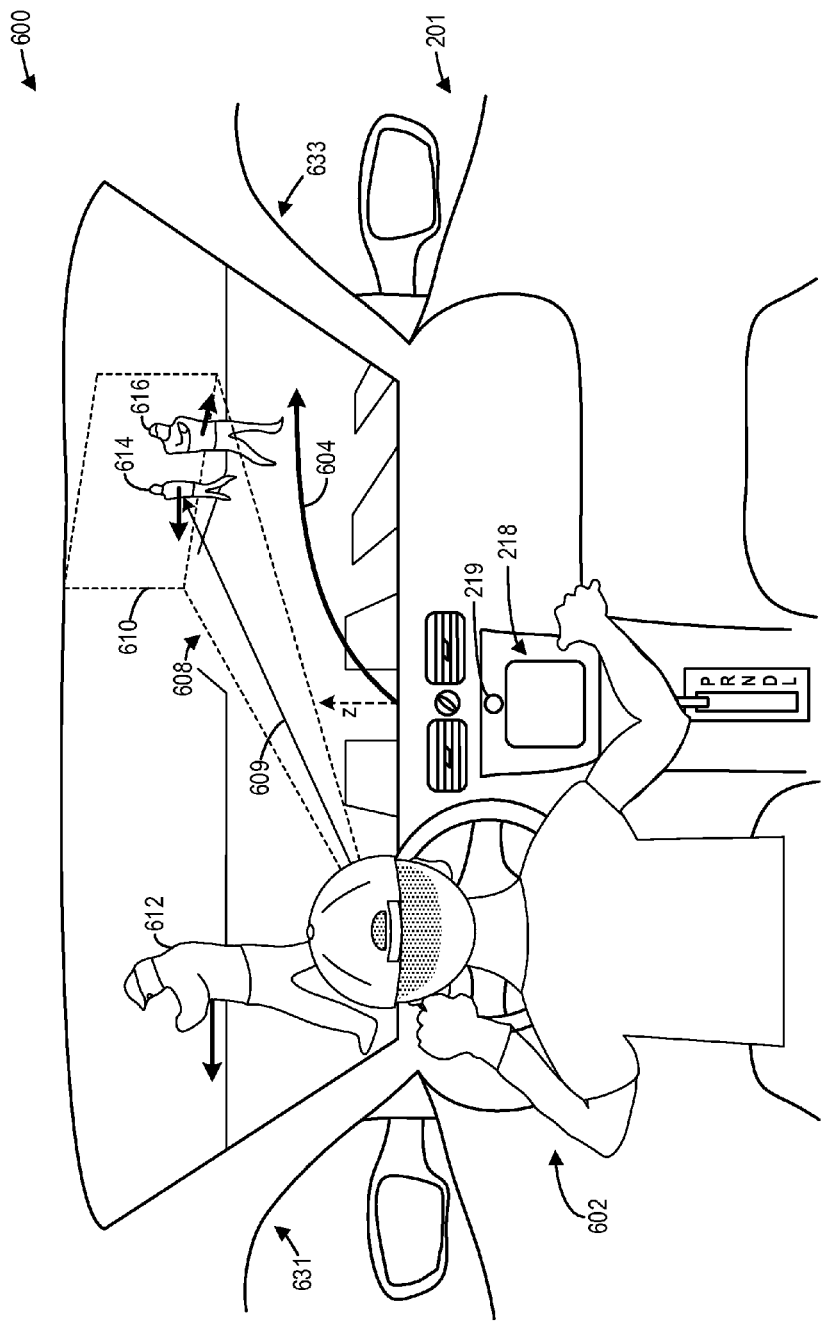
FIG. 6 shows an illustration of an example driving scenario in accordance with one or more embodiments of the present disclosure.

FIG. 6 shows an illustration of an example driving scenario 600 in accordance with one or more embodiments of the present disclosure. In particular, scenario 600 includes a driver 602 of a vehicle 201 at a street intersection. The vehicle 201 is configured with an in-vehicle computing system 200, and includes a user interface 218 and a gaze sensor 219. Although the gaze sensor 219 is depicted as positioned above the user interface 218 in the dashboard of the vehicle 201, such a position is exemplary and the gaze sensor 219 may be positioned elsewhere within the cabin of the vehicle 201. Further, while only one gaze sensor 219 is depicted, in some examples more than one gaze sensor 219 may be included in the vehicle 201.

The intended path 604 of the vehicle 201 may be measured, for example, with respect to a longitudinal axis z of the vehicle 201. As depicted in FIG. 6, the intended path 604 includes a right turn at the intersection, wherein right turn is calculated with respect to the vehicle axis z. While the vehicle axis z and the intended vehicle path 604 are depicted as arrows in FIG. 6, such arrows are exemplary and illustrative and may not be displayed to the driver. Rather, such information may instead be stored, at least temporarily, within a memory device of in-vehicle computing system 200.

Scenario 600 further includes several pedestrians crossing the intersection. In particular, a first pedestrian 612 is shown crossing a crosswalk directly in front of the vehicle 201, while a second pedestrian 614 and a third pedestrian 616 are shown crossing different crosswalks. An obstacle sensor (not shown) may detect and track the motion of each pedestrian as described herein above. The direction of motion, calculated by the obstacle sensor and/or processor of the in-vehicle computing system 200 for each pedestrian, is indicated in FIG. 6 by arrows attached to the respective pedestrian. The instantaneous position and direction of motion of each pedestrian may be calculated with respect to the longitudinal axis z of the vehicle. With this orientation, pedestrian 612 is moving to the left (i.e., orthogonal to the axis z) with a position located to the left of the axis z, pedestrian 616 is moving towards the vehicle (e.g., a negative z direction) and is located to the right of the axis z, and pedestrian 414 is moving to the left and is located to the right of the axis z.

The gaze 608 of the driver 602 includes a line-of-sight 609 and a field-of-view 610. As depicted, the line-of-sight 609 is directed towards the second pedestrian 614. Thus, the second pedestrian 614 is within the driver gaze 608. Furthermore, although the line-of-sight 609 is directed towards the second pedestrian 614, the third pedestrian 616 is located within the field-of-view 610. Specifically, the position of the third pedestrian 616 is within the field-of-view 610. Therefore, the second pedestrian 616 is also within the driver gaze 608. The first pedestrian 612, however, is not located within the driver gaze 608.

Note that the intended path of the third pedestrian 616 and the intended path 604 of the vehicle 201 intersect, and so it is possible that the vehicle 201 may collide with the third pedestrian 616. However, since the gaze 608 includes the third pedestrian 616, no alert may be generated. This is in contrast to typical pedestrian detection systems, which may generate an alert regarding the third pedestrian 616 (and likely an alert regarding the first pedestrian 612 as well) despite the fact that the driver 602 can see the third pedestrian 616.

Figure 7:
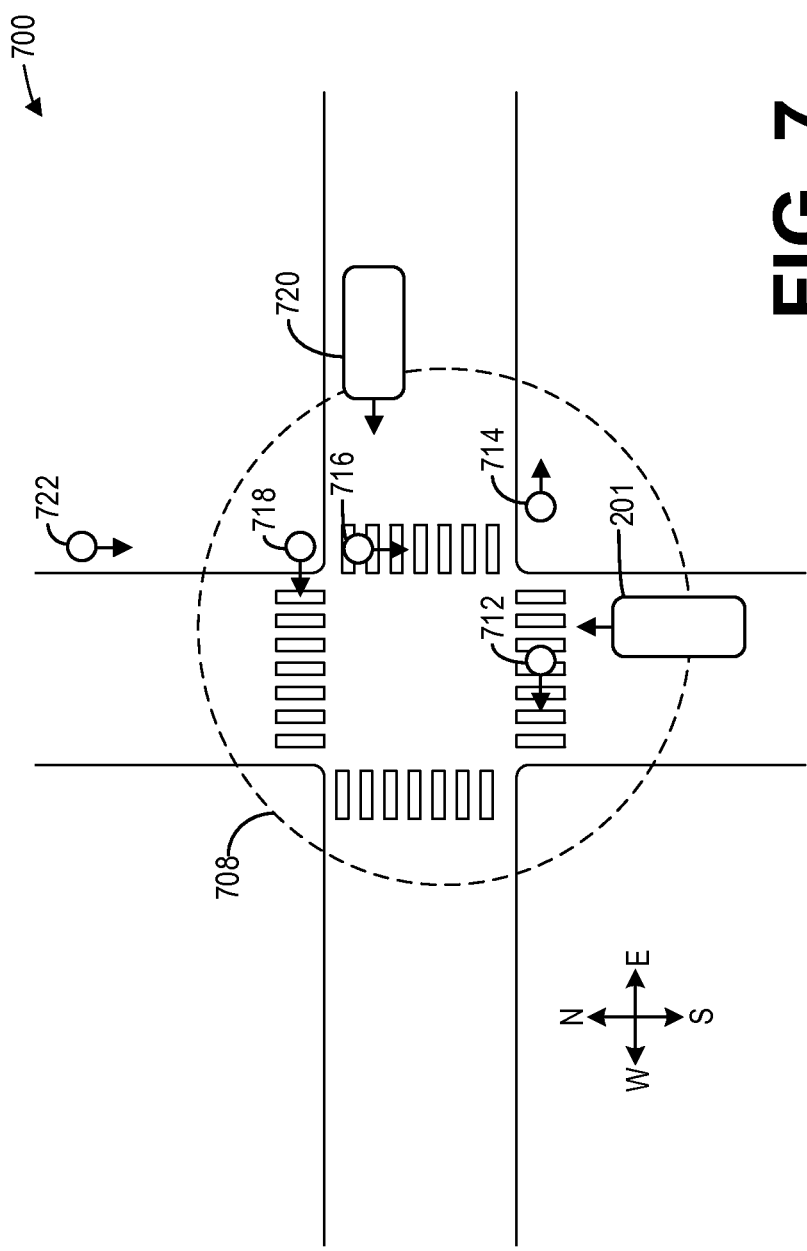
FIG. 7 shows a bird's-eye perspective of an example driving scenario in accordance with one or more embodiments of the present disclosure.

FIG. 7 shows a bird's-eye perspective of an example scenario 700 in accordance with one or more embodiments of the disclosure. In particular, situation 700 may be similar to the situation 600 described herein above with regard to FIG. 6. As depicted, the vehicle 201 may be stopped at an intersection filled with pedestrians, including pedestrian 712, pedestrian 714, pedestrian 716, and pedestrian 718. The vehicle 201 may include an in-vehicle computing system 200 configured to carry out the methods described herein above with regard to FIGS. 3-5. In particular, vehicle 201 may include an obstacle sensor, such as obstacle sensor 213 of FIG. 2, configured to detect and track pedestrians. As depicted, the obstacle sensor may be limited to detecting and tracking pedestrians within a threshold range 708. Threshold range 708 comprises a distance beyond which the obstacle sensor 213 may not detect and/or track potential obstacles. For example, the pedestrian 722 is located outside of threshold range 708, and so the in-vehicle computing system 200 of vehicle 201 may not generate any alerts regarding pedestrian 722 (e.g., regardless of whether the path of pedestrian 722 intersects with the path of the vehicle and/or whether the driver identifies the pedestrian). Although the threshold range 708 is depicted as excluding an area behind the vehicle 201, in some examples the threshold range 708 may be centered on the vehicle 201 and thus may include additional area.

The direction of motion of each pedestrian, indicated in the Figure by arrows attached to each pedestrian, as well as the speed of each pedestrian may be calculated based on obstacle sensor data as described herein above. Additionally or alternatively, the direction of motion and the speed of each pedestrian may be calculated based on GPS data received from a mobile computing device carried by one or more of the pedestrians. A second vehicle 720 is also shown entering the threshold range 708. The obstacle sensor of the vehicle 201 may detect and track the motion of the second vehicle 720. Additionally or alternatively, the in-vehicle computing device 200 of the vehicle 201 may retrieve GPS data from a similar in-vehicle computing device of the vehicle 720 or a mobile computing device carried by a driver and/or passenger of the vehicle 720, and may calculate the motion of the second vehicle 720 based on the received GPS data.

As described herein above with regard to FIG. 3, the in-vehicle computing system 200 may continuously calculate the intended path of the vehicle 201 as well as the intended path of each obstacle within the threshold range 708 (e.g., the pedestrian 712, pedestrian 714, pedestrian 716, pedestrian 718, and second vehicle 720). The gaze of the driver may also be continuously calculated, as described herein above with regard to FIG. 4, and compared to the position of each obstacle over time, as described herein above with regard to FIG. 5. If an obstacle, say pedestrian 718, begins crossing the street as the vehicle 201 is driving forward while the driver of the vehicle is looking elsewhere, the in-vehicle computing system 200 may generate an alert via the user interface 218 or the vehicle audio system 232 to draw the attention of the driver to the position of the pedestrian 718. However, if the driver sees the pedestrian 718, the in-vehicle computing system 200 may suppress the generation of the alert. In contrast, current pedestrian alert systems may generate the alert regardless of whether or not the driver has identified the pedestrian as a potential obstacle.

Note that in some examples, an obstacle may comprise a static (i.e., non-moving) or a dynamic (i.e., moving) object. For example, while pedestrians and vehicles are described herein above as typical obstacles, in some examples obstacles may comprise non-moving and inanimate objects such as a parked and empty vehicle, road debris, and so on. In such examples, the obstacle sensor 213 may detect the objects and calculate the position of the object and the velocity of the object (i.e., zero speed and no direction). An alert may be generated if the intended path of the vehicle coincides with the position of the object and the driver does not see the object in the path of the vehicle (e.g., based on an evaluation of driver gaze data).

In one embodiment, a method comprises calculating a first route of a vehicle, calculating a second route of an obstacle, calculating a gaze of a driver of the vehicle, generating an alert responsive to the gaze not including the obstacle and the first route intersecting the second route within a threshold duration, and suppressing generation of an alert otherwise. In one example, calculating the first route of the vehicle is based on navigation system data. In another example, calculating the first route of the vehicle is based on vehicle data including one or more of steering wheel angle, turn signal, and acceleration. In one example, calculating the second route of the obstacle is based on one or more of light sensor data, camera data, and GPS data, the GPS data received from a computing device carried by the obstacle. In another example, calculating the gaze of the driver is based on at least one or more of a head tilt angle, head turn angle, and eye position calculated from sensor data, and wherein the gaze of the driver does not include the obstacle when the gaze of the driver does not coincide with a position of the obstacle for a first threshold duration within a second threshold duration. In one example, the second route of the obstacle is calculated responsive to the obstacle within a threshold range of the vehicle. In another example, the method further comprises generating an alert responsive to a change in the second route of the obstacle while the gaze does not include the obstacle.

In another embodiment, an in-vehicle computing system of a vehicle comprises an inter-vehicle system communication module communicatively connecting the in-vehicle computing system to one or more vehicle systems of the vehicle, a processor, and a storage device storing instructions executable by the processor to calculate a first route of the vehicle, calculate a second route of an obstacle, calculate a gaze of a driver of the vehicle, generate an alert responsive to the gaze not including the obstacle and the first route intersecting the second route within a threshold duration, and suppress the alert otherwise. In one example, the in-vehicle computing system further comprises a navigation subsystem. In such an example, calculating the first route of the vehicle is based on navigation data received from the navigation subsystem. In another example, the in-vehicle computing system further comprises a gaze sensor. In such an example, calculating the gaze of the driver is based on at least one or more of a head tilt angle, head turn angle, and eye position calculated from gaze sensor data received from the gaze sensor. The gaze of the driver is not directed towards the obstacle when the gaze of the driver does not coincide with a position of the obstacle for a first threshold duration within a second threshold duration. In yet another example, calculating the first route of the vehicle is based on one or more parameters received from the one or more vehicle systems, the one or more parameters including a vehicle speed, steering wheel angle, turn signal status, and vehicle acceleration.

In another example, the in-vehicle computing system further comprises an obstacle sensor configured to measure a velocity of the obstacle. In such an example, calculating the second route of the obstacle is based on the velocity of the obstacle. In one example, the obstacle sensor comprises one or more cameras, and the velocity of the obstacle is measured from image data acquired by the one or more cameras. In another example, the obstacle sensor comprises a lidar subsystem, and the velocity of the obstacle is measured from light sensor data acquired by the lidar subsystem. As another example, calculating the second route of the obstacle is based on GPS data received from a computing device associated with the obstacle. In one example, the alert comprises one or more of a visual alert and an audible alert perceivable by the driver. In another example, the alert includes indicia regarding a position of the obstacle.

In yet another embodiment, a system for a vehicle comprises a sensor subsystem including at least an obstacle sensor and a gaze sensor, the obstacle sensor configured to detect a moving obstacle and a velocity of the moving obstacle, and the gaze sensor configured to detect a gaze of a driver of the vehicle. The system further comprises a user interface configured to provide alerts to the driver, a navigation subsystem configured to evaluate a route of the vehicle, a non-transitory memory, and a processor configured with executable instructions stored in the non-transitory memory that when executed cause the processor to calculate a route of the moving obstacle based on the velocity of the moving obstacle received from the obstacle sensor, generate via the user interface an alert responsive to the gaze of the driver not including the moving obstacle and the route of the moving obstacle intersecting with the route of the vehicle within a threshold duration, and suppress generation of an alert otherwise. In one example, the obstacle sensor comprises at least one camera. In another example, the obstacle sensor comprises a light radar detector. In another example, the gaze sensor comprises at least one camera configured to measure at least one or more of a head tilt angle, head turn angle, and eye position.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The methods may be performed by executing stored instructions with one or more logic devices (e.g., processors) in combination with one or more additional hardware elements, such as storage devices, memory, display devices, hardware network interfaces/antennas, switches, actuators, clock circuits, etc. For example, the one or more additional hardware elements may be controlled to produce a perceivable effect by the processor executing the stored instructions to perform one or more of the methods described herein. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
calculating a first route of a vehicle;
calculating a second route of an obstacle;
calculating a gaze of a driver of the vehicle;
determining whether the first route intersects the second route within a threshold duration;
generating an alert responsive to the gaze not including the obstacle when the first route intersects the second route within the threshold duration; and
suppressing generation of an alert otherwise.

2. The method of claim 1, wherein calculating the first route of the vehicle is based on navigation system data.

3. The method of claim 1, wherein calculating the first route of the vehicle is based on vehicle data including one or more of steering wheel angle, turn signal, and acceleration.

4. The method of claim 1, wherein calculating the second route of the obstacle is based on one or more of light sensor data, camera data, and GPS data, the GPS data received from a computing device carried by the obstacle.

5. The method of claim 1, wherein calculating the gaze of the driver is based on at least one or more of a head tilt angle, head turn angle, and eye position calculated from sensor data, and wherein the gaze of the driver does not include the obstacle when the gaze of the driver does not coincide with a position of the obstacle for a first threshold duration within a second threshold duration.

6. The method of claim 1, wherein the second route of the obstacle is calculated responsive to the obstacle within a threshold range of the vehicle.

7. The method of claim 1, further comprising generating an alert responsive to a change in the second route of the obstacle while the gaze does not include the obstacle.

8. An in-vehicle computing system of a vehicle, the in-vehicle computing system comprising:
an inter-vehicle system communication module communicatively connecting the in-vehicle computing system to one or more vehicle systems of the vehicle;
a processor; and
a storage device storing instructions executable by the processor to:
calculate a first route of the vehicle;
calculate a second route of an obstacle;
calculate a gaze of a driver of the vehicle;
determining whether the first route intersects the second route within a threshold duration;
generate an alert responsive to the gaze not including the obstacle when the first route is predicted to intersect the second route during a threshold duration measured from a current time; and
suppress an alert otherwise.

9. The in-vehicle computing system of claim 8, further comprising a navigation subsystem, and wherein calculating the first route of the vehicle is based on navigation data received from the navigation subsystem.

10. The in-vehicle computing system of claim 8, further comprising a gaze sensor, and wherein calculating the gaze of the driver is based on at least one or more of a head tilt angle, head turn angle, and eye position calculated from gaze sensor data received from the gaze sensor, and wherein the gaze of the driver is not directed towards the obstacle when the gaze of the driver does not coincide with a position of the obstacle for a first threshold duration within a second threshold duration.

11. The in-vehicle computing system of claim 8, wherein calculating the first route of the vehicle is based on one or more parameters received from the one or more vehicle systems, the one or more parameters including a vehicle speed, steering wheel angle, turn signal status, and vehicle acceleration.

12. The in-vehicle computing system of claim 8, further comprising an obstacle sensor configured to measure a velocity of the obstacle, and wherein calculating the second route of the obstacle is based on the velocity of the obstacle.

13. The in-vehicle computing system of claim 12, wherein the obstacle sensor comprises one or more cameras, and wherein the velocity of the obstacle is measured from image data acquired by the one or more cameras.

14. The in-vehicle computing system of claim 12, wherein the obstacle sensor comprises a lidar subsystem, and wherein the velocity of the obstacle is measured from light sensor data acquired by the lidar subsystem.

15. The in-vehicle computing system of claim 12, wherein calculating the second route of the obstacle is based on GPS data received from a computing device associated with the obstacle.

16. The in-vehicle computing system of claim 8, wherein the alert comprises one or more of a visual alert and an audible alert perceivable by the driver, and wherein the alert includes indicia regarding a position of the obstacle.

17. A system for a vehicle, comprising:
a sensor subsystem including at least an obstacle sensor and a gaze sensor, the obstacle sensor configured to detect a moving obstacle and a velocity of the moving obstacle, the gaze sensor configured to detect a gaze of a driver of the vehicle;
a user interface configured to provide alerts to the driver;
a navigation subsystem configured to evaluate a route of the vehicle;
a non-transitory memory; and
a processor configured with executable instructions stored in the non-transitory memory that when executed cause the processor to:
calculate a route of the moving obstacle based on the velocity of the moving obstacle received from the obstacle sensor;
generate, via the user interface, an alert responsive to at least a first condition and a second condition, the first condition comprising the gaze of the driver not including the moving obstacle and the second condition comprising a prediction that the route of the moving obstacle will intersect the route of the vehicle during a threshold duration measured from a current time; and
suppress generation of an alert otherwise.

18. The system of claim 17, wherein the obstacle sensor comprises at least one camera.

19. The system of claim 17, wherein the obstacle sensor comprises a light radar detector.

20. The system of claim 17, wherein the gaze sensor comprises at least one camera configured to measure at least one or more of a head tilt angle, head turn angle, and eye position.

* * * * *